United States Patent [19]

Browning et al.

[11] 3,900,941
[45] Aug. 26, 1975

[54] APPARATUS FOR AND METHOD OF INSTALLING AN EXPANDIBLE SLEEVE

[75] Inventors: Vernon D. Browning, Waynesville; Mayo B. Tell, Asheville, both of N.C.

[73] Assignee: Dayco Corporation, Dayton, Ohio

[22] Filed: Feb. 8, 1974

[21] Appl. No.: 440,923

[52] U.S. Cl. .................................. 29/450; 29/235
[51] Int. Cl.² ...................................... B23P 11/02
[58] Field of Search ............ 29/235, 446, 450, 451, 29/427

[56] References Cited
UNITED STATES PATENTS

| | | | |
|---|---|---|---|
| 1,322,843 | 11/1919 | Townsend | 29/235 X |
| 2,497,921 | 2/1950 | Ballard | 29/450 |
| 2,980,474 | 4/1961 | Gargan | 29/427 UX |
| 3,581,379 | 6/1971 | Drobilits | 29/235 X |

*Primary Examiner*—Charlie T. Moon
*Attorney, Agent, or Firm*—Reuben Wolk

[57] ABSTRACT

An apparatus for and method of installing an expandible resilient sleeve on an associated cylindrical support are provided and such apparatus comprises a tapered mandrel having a longitudinal axis and having fluid passage means therein at a plurality of locations along the axis and means for selectively introducing a fluid under pressure to the passage means at each of the locations.

17 Claims, 16 Drawing Figures

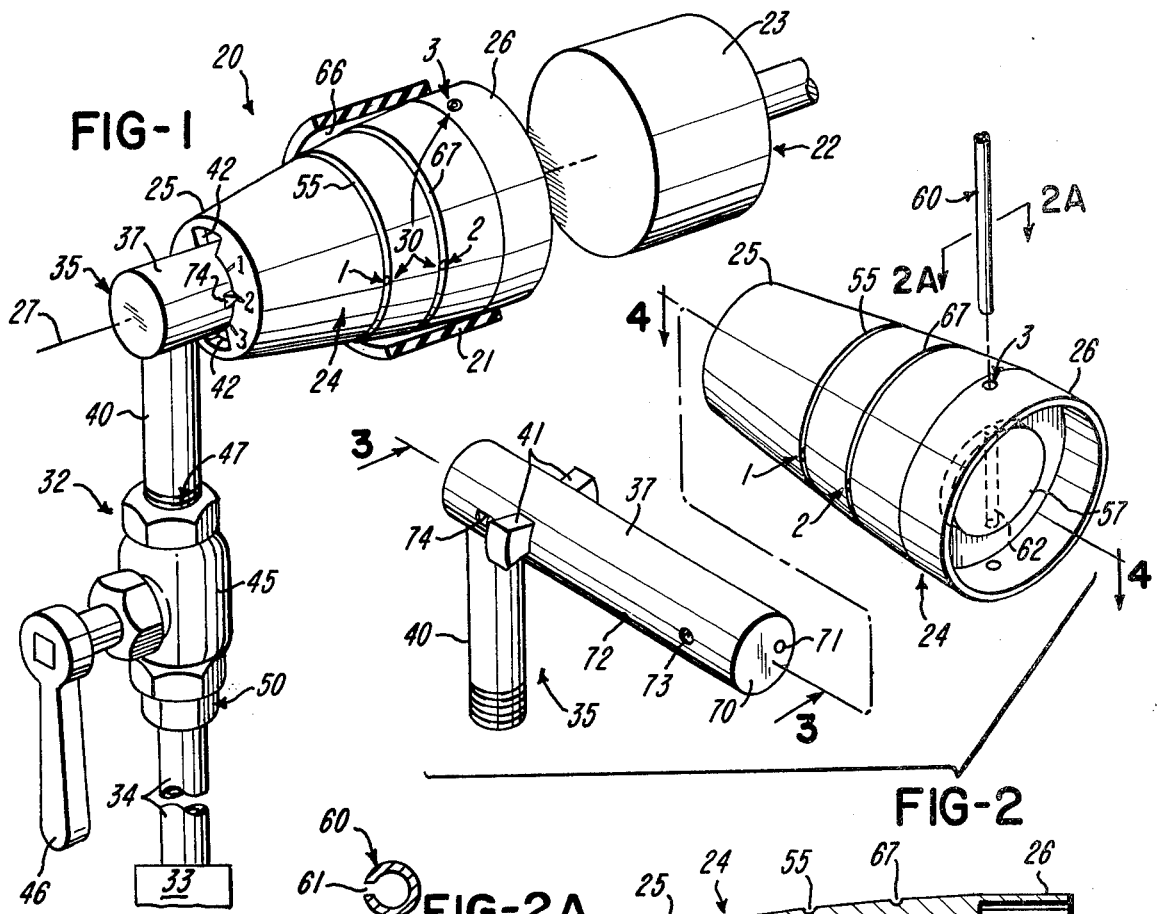

APPARATUS FOR AND METHOD OF INSTALLING AN EXPANDIBLE SLEEVE

BACKGROUND OF THE INVENTION

There are many industrial applications such as in the textile industry, in the making of endless power transmission belts using tubular elastomeric sleeves, in the printing industry, and the like, where a radially expandible, resilient, elastomeric sleeve such as a rubber sleeve, for example, is employed for various uses and is installed concentrically around an associated rotatable cylindrical support. In these types of applications, as a sleeve becomes excessively worn or damaged it is usually cut away from its support and replaced with a new sleeve.

However, each new sleeve usually has an inside diameter which is slightly smaller than the outside diameter of the cylindrical support upon which such a sleeve is to be installed making it very difficult and time consuming to install such a new sleeve in position. In many instances a new sleeve is seriously damaged during installation making it unfit for use. Therefore, it is apparent that the installation of a radially expandible tubular sleeve made of an elastomeric material around an associated cylindrical support of the character mentioned presents certain problems.

SUMMARY

This invention provides an improved apparatus for and method of installing a radially expandible, resilient, sleeve on an associated support which enables efficient installation of the sleeve without damage thereto. The apparatus comprises a tapered mandrel having a longitudinal axis and having fluid passage means therein at a plurality of locations along the axis and such apparatus also includes means for selectively introducing a fluid under pressure to the passage means at each of the locations.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in cross section and parts broken away particularly illustrating an exemplary apparatus and method of this invention being utilized to install an expandible sleeve on an associated cylindrical support;

FIG. 2 is an exploded perspective view particularly illustrating a tapered mandrel and an associated rotatable fluid manifold normally rotatably supported within such mandrel together with a roll pin used in such mandrel;

FIG. 2A is a cross-sectional view taken essentially in the line 2A—2A of FIG. 2;

FIG. 3 is a side elevation of the manifold illustrated in perspective of FIG. 2 with a fragmentary portion thereof broken away;

FIG. 4 is a cross-sectional view taken essentially on the line 4—4 of FIG. 2;

FIG. 5 is a fragmentary view with parts in cross section taken essentially on the line 5—5 of FIG. 4;

FIG. 6 is a view taken essentially on the line 6—6 of FIG. 5;

DESCRIPTION OF ILLUSTRATED EMBODIMENTS

Figure 7:
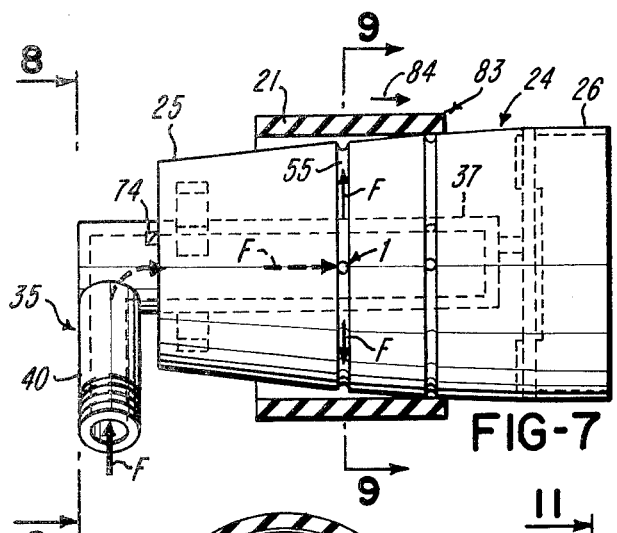
FIG. 7 is a side elevation of the apparatus of this invention being used during an initial step to install an expandible resilient sleeve, shown in cross section, and particularly illustrating an end portion of the sleeve concentrically around a small diameter end portion of the tapered mandrel with air under pressure being introduced to partially expand such sleeve.
Figure 8:
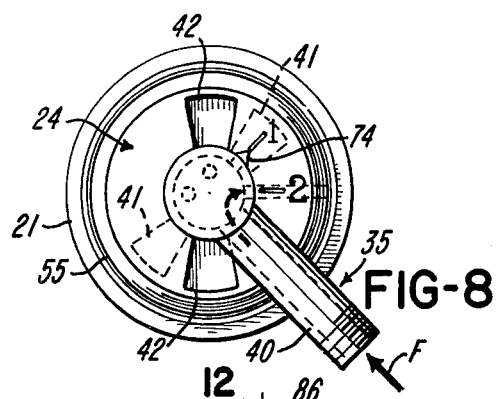
FIG. 8 is a view taken essentially on the line 8—8 of FIG. 7.
Figure 9:
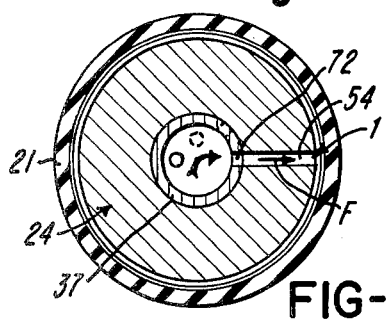
FIG. 9 is a cross-sectional view taken essentially on the line 9—9 of FIG. 7.

Reference is now made to FIG. 1 of the drawings which illustrates one exemplary embodiment of the apparatus and method of this invention which is designated generally by the reference numeral 20 and such apparatus and method are particularly adapted for use in installing a radially expandible resilient sleeve 21. The sleeve 21 may be made of any suitable elastomeric material and for ease of presentation is illustrated by cross-hatching herein as being made of rubber. The apparatus 20 is particularly adapted for use in installing the sleeve 21 on an associated rotatable support which for simplicity is shown in this disclosure as a support 22 having a right circular cylindrical outside surface 23.

The apparatus 20 comprises a tapered mandrel which is designated generally by the reference numeral 24 having a small diameter end 25 and a large diameter end 26 and the mandrel of this example has a substantially frustoconical outside surface and a central longitudinal axis 27 therethrough. The frustoconical mandrel 24 has fluid passage means provided therein which is designated generally by the reference numeral 30 and such fluid passage means is provided at a plurality of locations along the axis 27 as will be described in detail subsequently.

Figure 10:
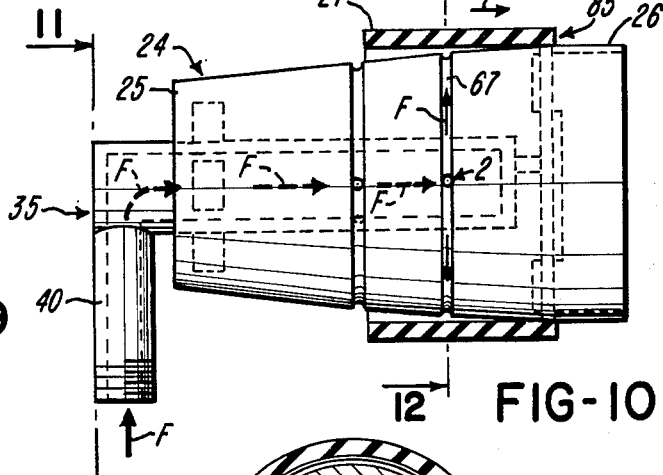
FIG. 10 is a view similar to FIG. 7 illustrating the sleeve moved axially to a next one or second location along the tapered mandrel and the introduction of fluid under pressure at such second location to further expand the sleeve and allow further axial sliding movement thereof along the mandrel toward the large diameter end of such mandrel.
Figure 13:
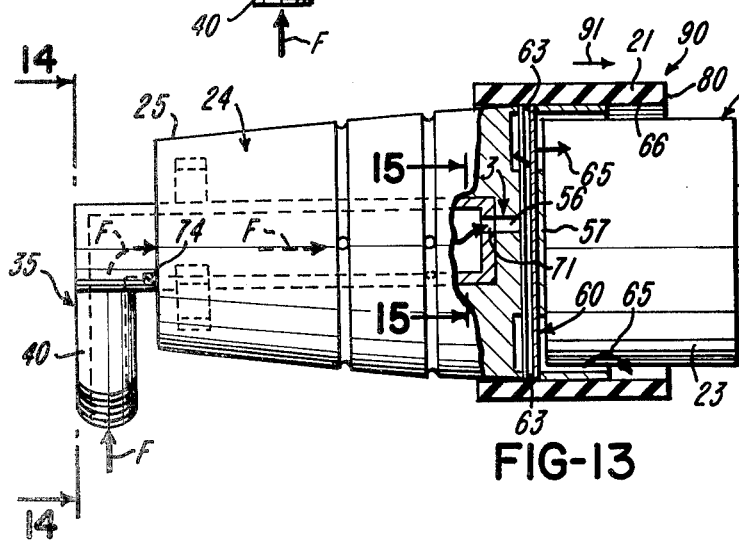
FIG. 13 is a view similar to FIG. 7 illustrating the sleeve moved axially to a next or third location along the mandrel and the introduction of fluid under pressure at such third location to further radially expand the sleeve and allow further axial sliding movement onto an associated cylindrical support for such sleeve.

The apparatus 20 also comprises means 32 for selectively introducing fluid under pressure to the passage means at each of the locations and in this example the fluid passage means 30 is provided at a plurality of three locations identified as locations 1, 2, and 3 and the mandrel is particularly adapted to receive an end portion of the sleeve 21 concentrically around the small diameter end 25 whereupon the means 32 for selectively introducing fluid under pressure to location 1 is operated causing partial radial expansion of the sleeve 21 as illustrated in FIG. 7 allowing axial sliding movement of the sleeve parallel to and along the longitudinal axis 27 to a next location or location 2 as shown in FIG. 10. At location 2 the means 32 for selectively introducing fluid is again operated to introduce fluid under pressure to the second location again causing further radial expansion of the sleeve 21 and again allowing sliding movement of the sleeve along the axis 27 toward the large diameter end 26 and to location 3, as shown in FIG. 13. At location 3 the means for selectively introducing fluid under pressure is again operated again causing further radial expansion of the sleeve enabling manual axial sliding movement thereof over the large diameter end 26 and onto the cylindrical support 22 and in a manner to be described in more detail subsequently.

The apparatus 20 is particularly adapted to operate utilizing a pressurized fluid such as air, designated by solid arrows F in the drawings, and such pressurized air is provided from a suitable source 33 thereof of known construction and operation which is designated schematically in FIG. 1 by a fragmented rectangular block. A conduit 34 is provided for connecting the apparatus 20 to the air pressure source 33 and suitable air pressure regulating devices, or the like, may be provided in the conduit 34 for regulating air pressure within a predetermined pressure range in accordance with techniques known in the art.

The means 32 for selectively introducing air under pressure comprises a movable device which will be identified and referred to hereinafter as a manifold 35 and means for supporting the manifold within the mandrel 24. In particular the manifold supporting means comprises a right circular cylindrical surface means 36, see FIG. 4, which rotatably supports the manifold in a manner to be described in more detail subsequently.

The manifold 35 comprises a substantially L-shaped manifold having a tubular leg portion 37 received within the mandrel 24 and the leg portion 37 is rotatably supported on the surface 36. The manifold 24 has another leg portion 40 which extends transverse the tubular portion 37 and the manifold 35 also has a pair of substantially diametrically opposed locking ears or projections 41 of roughly trapezoidal outline when viewed from an end thereof which are particularly adapted to be inserted through a pair of diametrically arranged slots 42, also of trapezoidal end outline, in the mandrel 24. The projections 41 are constructed and arranged so that they may be rotated within a substantially annular slot 43 provided adjacent the small diameter end 25 of the mandrel 24 enabling the manifold 35 to be freely rotated within the slot 24 about the axis 27. The slot 43 has a pair of opposed parallel surfaces each designated by the reference numeral 44 which are particularly adapted to engage associated opposed parallel surfaces of projections 41 and the surfaces 44 prevent axial sliding movement of the manifold 35 during rotation thereof.

As will be apparent particularly from FIG. 1 of the drawings the means 32 for selectively introducing air under pressure to the fluid passage means 30 of the mandrel 24 also includes an air valve 45 which has an on-off manually operated actuating lever 46 and the valve 45 is threadedly connected to the manifold 35 and in particular to the leg 40 of such manifold 45 as illustrated at 47. The inlet end of the valve 45 is threadedly connected to the conduit 34 as illustrated at 50, whereby air under regulated pressure is supplied from source 30 through conduit 34 and air valve 45 to the manifold 35.

As previously mentioned, the frustoconical mandrel 24 has air passage means 30 therein and in this example such air passage means comprises first air passage means 51 at location 1 adjacent the small diameter end 24 of the mandrel, second air passage means 52 at location 3 adjacent the large diameter end 26 of the mandrel, and third air passage means 53 at location 2 which is intermediate the small 25 and large 26 diameter ends of the mandrel 24.

As seen particularly in FIGS. 2 and 4 the first air passage means 51 at location 1 is comprised of a substantially radially extending passage 54 extending through the mandrel and communicating with the right circular cylindrical surface 36 thereof which supports the tubular portion 37 of the manifold 35; and, the passage 54 exits into a circumferential groove 55 provided in the mandrel.

The second air passage means 52 comprises a substantially longitudinal passage 56 through an end portion 57 of the mandrel 24 adjacent the large diameter end thereof and conduit means in the form of a roll pin 60 for placing the longitudinal passage 56 in flow communication with the outer periphery of the frustoconical mandrel adjacent the large diameter end 26. The roll pin 60 is of known conventional roughly C-shaped construction and as shown in FIG. 2A has a space 61 along the full length thereof whereby such pin may be inserted through a bore 62 in the end portion 57 of the mandrel 24 with the bore 62 extending perpendicular the longitudinal axis 27 and intersecting the longitudinal passage 56 allowing air to flow through the passage 56 and through slot 61 into and along the inside surface of the roll pin 61 whereby the roll pin 60 serves to confine the air along the inside surface thereof allowing exiting of such pressurized air through diametrically opposed outlets 63, see FIGS. 5 and 6, yet allowing leakage along the slot 61 so that air under pressure is applied to the inside surface 66 of the sleeve 21 not only through the diametrically opposed outlets 63 but also as indicated by arrows 65 in FIG. 13 to help pressurize other locations of the inside surface 66 of the tubular sleeve and provide further partial expansion thereof to further facilitate axial sliding movement of the sleeve 21 over the end 26 and onto the cylindrical support 22.

In this example, air passage means 53 is also provided at location 2 between locations 1 and 3 and in essence the air passage means 53 is provided between the air passage means 51 and 52. The air passage means 53 is very similar to the air passage means 51 and comprises a radially extending passage 66 extending through the mandrel 24 and exiting into a circumferential groove 67 provided in the mandrel and extending inwardly from the outside surface of such mandrel; and, the inlet end of the radially extending passage 66 communicates with the right circular cylindrical surface 36.

The rotatable manifold 35 is particularly adapted to be rotated in an indexing manner to a plurality of three positions which are identified on the mandrel 24 as positions 1, 2, and 3 and each of these positions operatively associates the manifold 35 with an associated passage means either 51, 53, or 52 in the mandrel 24 at corresponding locations previously identified as 1, 2, and 3 respectively. To facilitate indexing rotation of the manifold 35 and the valve 45 operatively connected thereto it will be appreciated that the conduit 34 is made of a readily flexible material preferably an elastomeric material such as rubber.

As will be apparent from FIGS. 2 and 3 the tubular portion 37 of the manifold 35 has a right circular cylindrical outside surface which terminates in a flat end closure 70. The flat end closure has a longitudinally extending bore 71 which is particularly adapted to communicate with the longitudinal passage 56 in the mandrel 24 when the rotatable manifold 35 is rotated so that it is in position 3 and as will be described in more detail subsequently.

The tubular portion 37 of manifold 35 has a plurality of roughly radially extending bores 72 and 73. The bore 72 is positioned along the tubular portion 37 so that with the manifold 35 placed within the mandrel 24 with the projections 41 thereof received within the annular slot 43 the bore 72 is in a plane which is coplanar with the substantially radially extending passage 54 and its associated annular groove 55. Similarly, the radially extending bore 73 is axially located along the length of the tubular portion 37, with the manifold 35 suitably supported within the mandrel 24, so that bore 73 is substantially coplanar with the radially extending passage 66 and the circumferential groove 67.

The manifold 35 has a marker or pointer 74 thereon which is particularly adapted to be rotatably aligned with positions 1, 2, and 3. Once the manifold and pointer 74 is rotated to position 1 in the manner illustrated in FIG. 7 the bore 72 is aligned with passage means 51 defined by 54 and 55 at location 1. Upon further clockwise rotation (as viewed in FIG. 1) of the manifold 35 so that the pointer 74 is at position 2 the opening 73 is aligned with passage means 53 defined by passage 66 and groove 67 at location 2 in the manner illustrated in FIG. 10. Further clockwise rotation of the manifold 35 so that the pointer 74 is at position 3 results in the longitudinal bore 71 being aligned with the longitudinal passage 56 allowing air flow therethrough and along the roll pin 60 in the manner illustrated in FIG. 13.

The substantially frustoconical mandrel 24 has a tubular extension 76, see FIGS. 4 and 5, extending from the large diameter end thereof and the tubular extension 76 has an inside diameter 77 which is particularly dimensioned so that it will receive the cylindrical support 22 therewithin in the manner illustrated in FIG. 13. With the cylindrical support 22 received within the large diameter end 26 of the mandrel 24, the sleeve 21 may be slid axially so that an end 80 thereof is substantially aligned with an associated end 81 of the cylindrical support 22.

Having described the detailed construction of the apparatus of this invention, reference is now made to FIGS. 7 through 15 of the drawings for a brief presentation of the method of this invention of installing a partially elastic or resilient expandable sleeve such as rubber sleeve 21 on the associated cylindrical support 22 utilizing the apparatus 20. In particular, it will be seen that the sleeve 21 is placed concentrically around the mandrel 24 adjacent the small diameter end 25 thereof as illustrated at 83 in FIG. 7 whereupon fluid in the form of air F under pressure, in this example, is selectively introduced to the passage means 51 at location 1 and this is achieved by initially rotating the manifold 35 so that the pointer 74 thereof is at position 1 in the manner illustrated in FIG. 8 causing (once the valve 45 is opened) partial expansion of the sleeve 21 as illustrated in FIG. 7. The sleeve 21 is then axially slid as indicated by arrows 84 in FIG. 7 to a next location shown as location 2 and as illustrated at 85 in FIG. 10.

Figure 11:
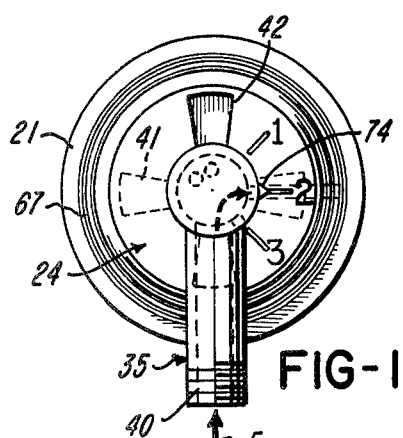
FIG. 11 is a view taken essentially on the line 11—11 of FIG. 10.
Figure 12:
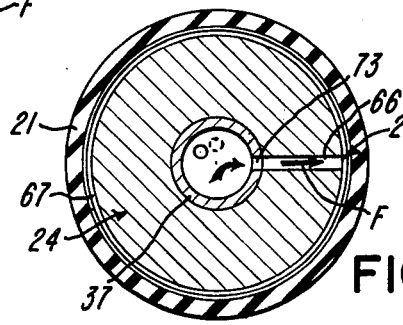
FIG. 12 is a cross-sectional view taken essentially on the line 12—12 of FIG. 10.

At location 2, which is also the location illustrated in FIG. 1, air under pressure is introduced to the passage means 53 by first rotatably moving the manifold 35 so that the pointer 74 thereof is at position 2 as shown in FIG. 11 whereupon with the valve 45 open air under pressure flows through the passage means 53 at location 2 causing further partial expansion of the sleeve 21. The sleeve 21 is again axially slid along the mandrel 24 as indicated by the arrows 86 in FIG. 10 to the next location which is location 3 and as illustrated at 90 in FIG. 13.

Figure 14:
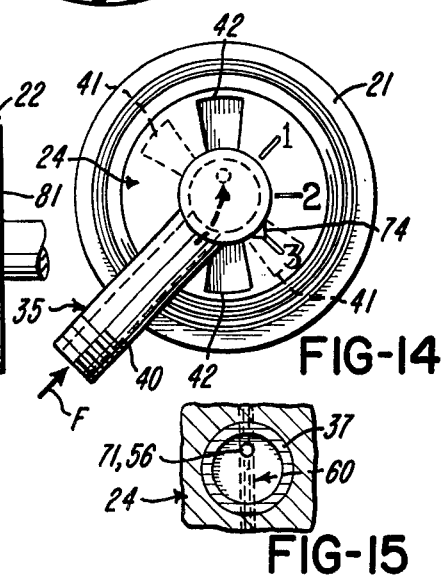
FIG. 14 is a view taken essentially on the line 14—14 of FIG. 13.
Figure 15:
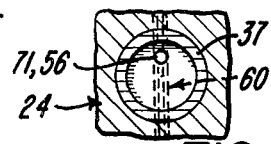
FIG. 15 is a fragmentary cross-sectional view taken essentially on the line 15—15 of FIG. 13.

At location 3 the manifold 35 is rotated so that the pointer 74 thereon is aligned with position 3, see FIG. 14, allowing, with the valve 45 in its open position, air under pressure to flow through the passage means 52 causing partial radial expansion of the sleeve 21 and allowing further axial sliding movement as indicated by the arrows 91 in FIG. 13 until the ends 80 and 81 of the sleeve and rotatable support 22 are in substantially aligned relation or approximately coplanar. Once this has been achieved the rotatable support 22 and mandrel 24 are axially moved apart while holding the sleeve 21 in position over the rotatable support 22 whereupon the sleeve 21, due to the resilient character thereof, contracts radially inwardly and is received against the outside surface 23 of the cylindrical support 22 and is held thereagainst substantially by friction.

During the partial expansion of the sleeve 21 at location 3 as illustrated in FIG. 13 and as previously mentioned, it will be appreciated that pressurized air is confined along the roll pin so that it exits outlets 63. Further, pressurized air also flows as indicated by the arrows 65 in FIG. 13 to provide partial radial expansion of the sleeve 66 at locations outwardly of the tubular extension 76 of the mandrel 24 while also serving as an air bearing to facilitate axial sliding movement of the sleeve 21 onto the cylindrical support 22.

In this disclosure of the invention it will be seen that the valve 45 is shown as a simple air valve having an on-off actuating lever 46; however, it will be appreciated that any suitable valve mechanism may be utilized and operatively connected with the manifold 35. Further, any value mechanism such as valve 45 need not necessarily be installed in the leg portion 40 of the manifold 35 but may be installed downstream thereof in the conduit 34 and remotely operated either semiautomatically or automatically by suitable means.

In this disclosure of the invention the sleeve 21 has been illustrated and described as being made of elastomeric material in the form of a rubber material and will be appreciated that such rubber material may be either a natural or synthetic rubber compound. Further, it will be appreciated that the sleeve 21 may be made of any suitable elastomeric material which is substantially resilient and radially expandible in a similar manner as rubber and wherein such elastomeric sleeve would be supported on a cylindrical support similar to support 22 using the apparatus and method of this invention as presented herein.

In this disclosure of the invention air passage means 30 have been illustrated comprised of passage means 51, 52, and 53 at a plurality of three locations; and, this has been achieved for simplicity. However, it is to be understood that air passage means may be provided in the tapered mandrel at a plurality of only two locations or at a plurality of more than three locations, if desired.

While present exemplary embodiments of this invention, and methods of practicing the same, have been illustrated and described, it will be recognized that this invention may be otherwise variously embodied and practiced within the scope of the following claims.

What is claimed is:

1. An apparatus for installing an expandible sleeve on an associated cylindrical support comprising, a tapered mandrel having small and large diameter ends and a longitudinal axis and having fluid passage means therein at a plurality of locations along said axis, and means for selectively introducing fluid under pressure to the passage means at each of said locations, said tapered mandrel having a tubular extension extending from its large diameter end, said tubular extension being adapted to receive said associated cylindrical support therewithin, said tapered mandrel being adapted to receive an end portion of said sleeve concentrically around said small diameter end whereupon said means for selectively introducing said fluid is operated to introduce fluid under pressure to a first of said locations causing partial expansion of said sleeve and allowing axial sliding movement of said sleeve to a next one of said locations whereupon said means for selectively introducing fluid is again operated to introduce fluid under pressure to said next location thereby causing further expansion of said sleeve and again allowing axial sliding movement of said sleeve toward said large diameter end.

2. An apparatus as set forth in claim 1 in which said fluid passage means comprises air passage means and said means for selectively introducing comprises a movable air manifold and means supporting said manifold within said mandrel.

3. An apparatus as set forth in claim 2 in which said means for selectively introducing comprises an air valve operatively connected to said movable air manifold and means for supplying air to said valve and manifold.

4. An apparatus as set forth in claim 2 in which said means supporting said manifold within said mandrel comprises means rotatably supporting said manifold whereby said air manifold is movable by rotation thereof in an indexing manner to a plurality of preselected positions.

5. An apparatus as set forth in claim 2 in which said tapered mandrel has a substantially frustoconical outside configuration.

6. An apparatus as set forth in claim 5 in which said air passage means comprises first air passage means adjacent said small diameter end and second air passage means adjacent said large diameter end, said first air passage means comprising a substantially radially extending passage through said mandrel and a circumferential groove provided in said mandrel and communicating with said radially extending passage.

7. An apparatus as set forth in claim 6 in which said second air passage means comprises a substantially longitudinal passage through a portion of said mandrel and conduit means for placing said longitudinal passage in flow communication with the outer periphery of said frustoconical mandrel adjacent said large diameter end.

8. An apparatus as set forth in claim 7 in which said conduit means comprises a roll pin having an open slot therein extending along the entire length thereof.

9. An apparatus as set forth in claim 7 in which said manifold has a tubular portion disposed within said mandrel and said means supporting said mandrel comprises cylindrical surface means in said mandrel rotatably supporting said tubular portion.

10. An apparatus as set forth in claim 9 in which said tubular portion has a cylindrical outside surface terminating in a flat end closure, said flat end closure having a longitudinally extending bore which is adapted to be aligned with said longitudinal passage of said second air passage means.

11. An apparatus as set forth in claim 10 in which said tubular portion also has a radially extending bore therein adapted to be aligned with said radially extending passage of said first passage means.

12. A method of installing an expandible resilient sleeve on an associated cylindrical support comprising the steps of, placing said sleeve concentrically around a small diameter end portion of a tapered mandrel having small and large diameter ends and having a longitudinal axis and also having fluid passage means therein at a plurality of locations along said axis, selectively introducing fluid under pressure to the passage means at a first of said locations causing partial expansion of said sleeve, axially sliding said sleeve along said mandrel toward said large diameter end to another one of said locations, selectively introducing fluid under pressure to the passage means at said other location again causing partial expansion of said sleeve, and again axially sliding said sleeve along said mandrel over said large diameter end and concentrically around said cylindrical support.

13. A method as set forth in claim 12 in which said placing step comprises placing said sleeve concentrically around a small diameter end portion of a substantially frustoconical mandrel.

14. A method as set forth in claim 13 in which said steps of selectively introducing fluid under pressure are defined by the steps of selectively introducing air under pressure.

15. A method as set forth in claim 14 in which said steps of axially sliding said sleeve along said mandrel comprise manually axially sliding said sleeve.

16. A method as set forth in claim 14 in which said placing step comprises placing said sleeve concentrically around a portion of a mandrel having a tubular extension extending from its large diameter end and comprising the further step of arranging said cylindrical support concentrically within said tubular extension to facilitate axial sliding movement of said sleeve thereover.

17. A method as set forth in claim 16 and comprising the further step of moving said mandrel and support apart while holding said sleeve and support with associated ends in aligned relation.

* * * * *